US006837511B1

(12) United States Patent
Johnson, III

(10) Patent No.: US 6,837,511 B1
(45) Date of Patent: Jan. 4, 2005

(54) CAM LOCKING REMOVABLE HITCH ASSEMBLY APPARATUS AND SYSTEM

(76) Inventor: G. Cliff Johnson, III, 5711 Lee Rd., #240, Phenix City, AL (US) 36870

( * ) Notice: Subject to any disclaimer, the term of this patent is extended or adjusted under 35 U.S.C. 154(b) by 7 days.

(21) Appl. No.: 10/454,427

(22) Filed: Jun. 4, 2003

(51) Int. Cl.[7] ................................................. B60D 1/06
(52) U.S. Cl. ..................................... 280/511; 280/491.5
(58) Field of Search .............................. 280/511, 491.1, 280/491.2, 491.5, 901, 416.1

(56) References Cited

U.S. PATENT DOCUMENTS

| 3,307,857 | A | * | 3/1967 | Robertson | 280/511 |
| 4,201,400 | A | * | 5/1980 | Hoogenbosch | 280/511 |
| 5,472,222 | A | * | 12/1995 | Marcy | 280/433 |
| 5,860,671 | A | * | 1/1999 | Mackeown | 280/511 |
| 5,871,222 | A | * | 2/1999 | Webb | 280/511 |
| 6,099,015 | A | * | 8/2000 | Marcy | 280/433 |
| 6,695,338 | B1 | * | 2/2004 | Roberts | 280/491.5 |

* cited by examiner

Primary Examiner—Anne Marie Boehler
(74) Attorney, Agent, or Firm—Hinkle & O'Bradovich, LLC

(57) ABSTRACT

A cam locking removable hitch assembly apparatus and system is described. The apparatus generally includes a hitch-ball shank in engagement with a shank sleeve that is in engagement with an outer sleeve. A nut is in threaded engagement with a lower portion of the hitch-ball shank securing the outer sleeve around the shank sleeve. Shank lugs, on a lower portion of the hitch-ball shank, engage with shear lugs internal to the shank sleeve when the hitch-ball shank is rotated with respect to the shank sleeve. Cam's on the upper portion of the hitch-ball shank engage with cam grooves on an upper portion of the shank sleeve, thereby locking the hitch-ball shank within the shank sleeve. The hitch assembly apparatus can be connected to a frame that is secured in a bed of a truck forming a cam locking removable hitch assembly system.

20 Claims, 4 Drawing Sheets

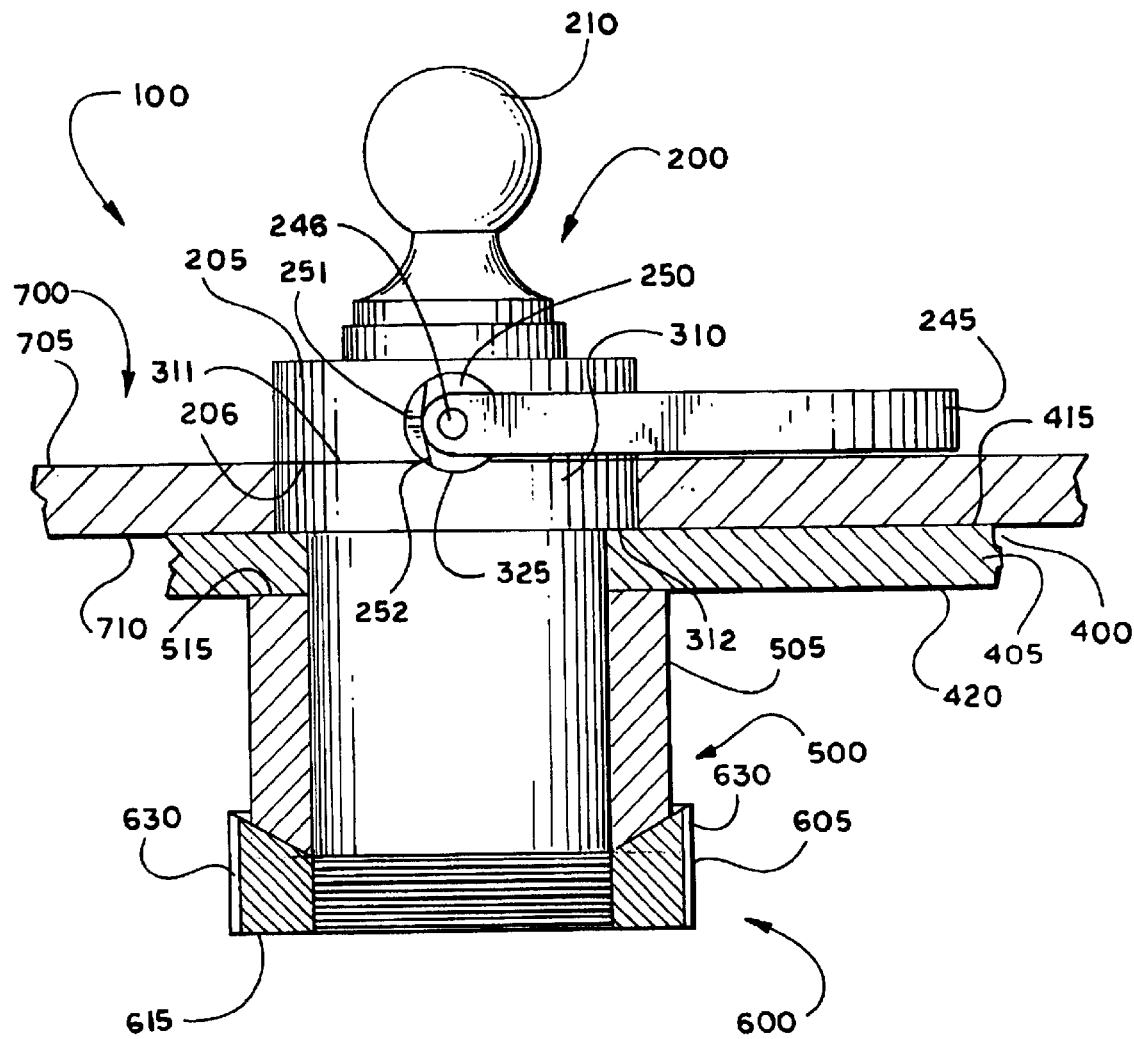
Fig_2

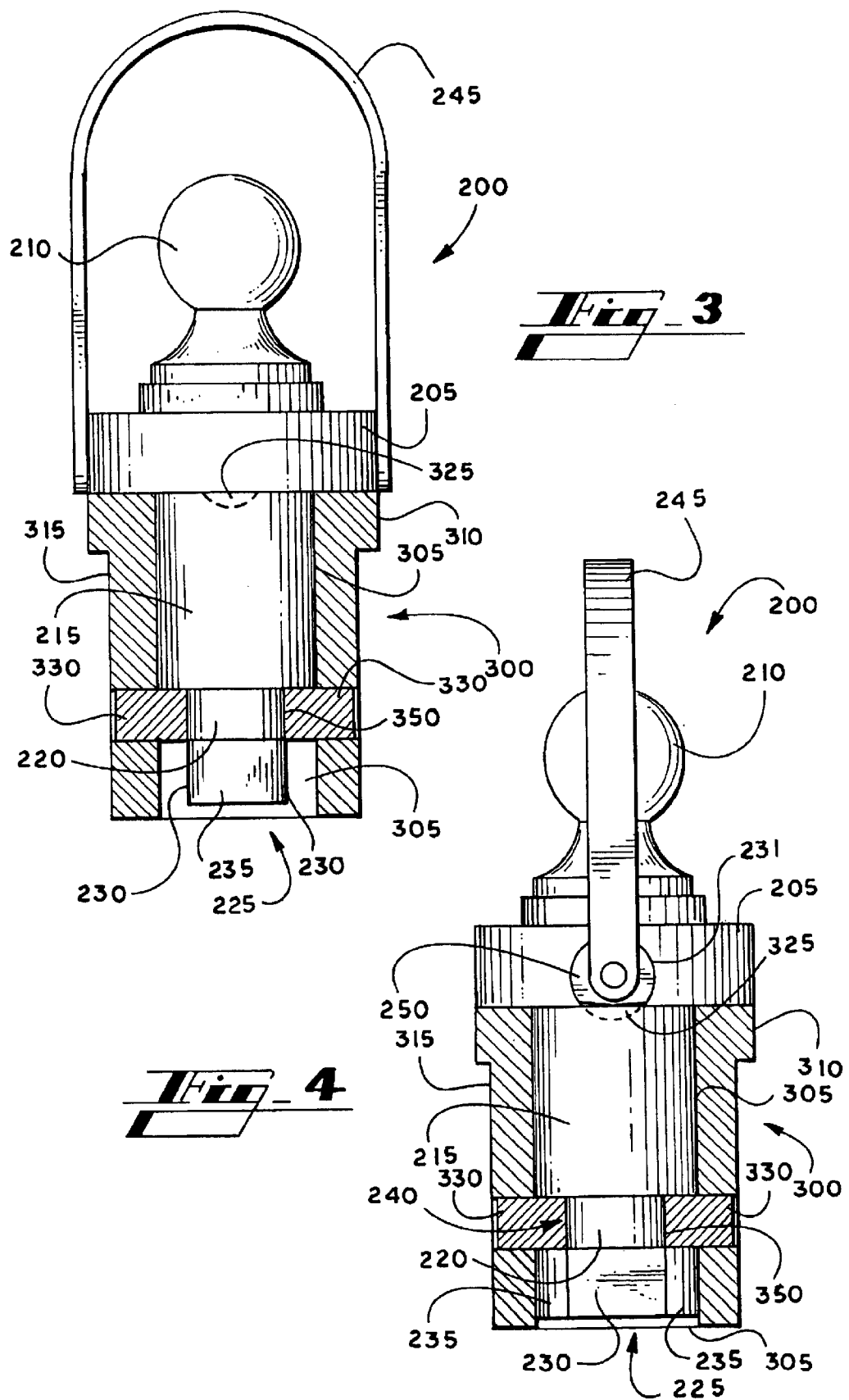

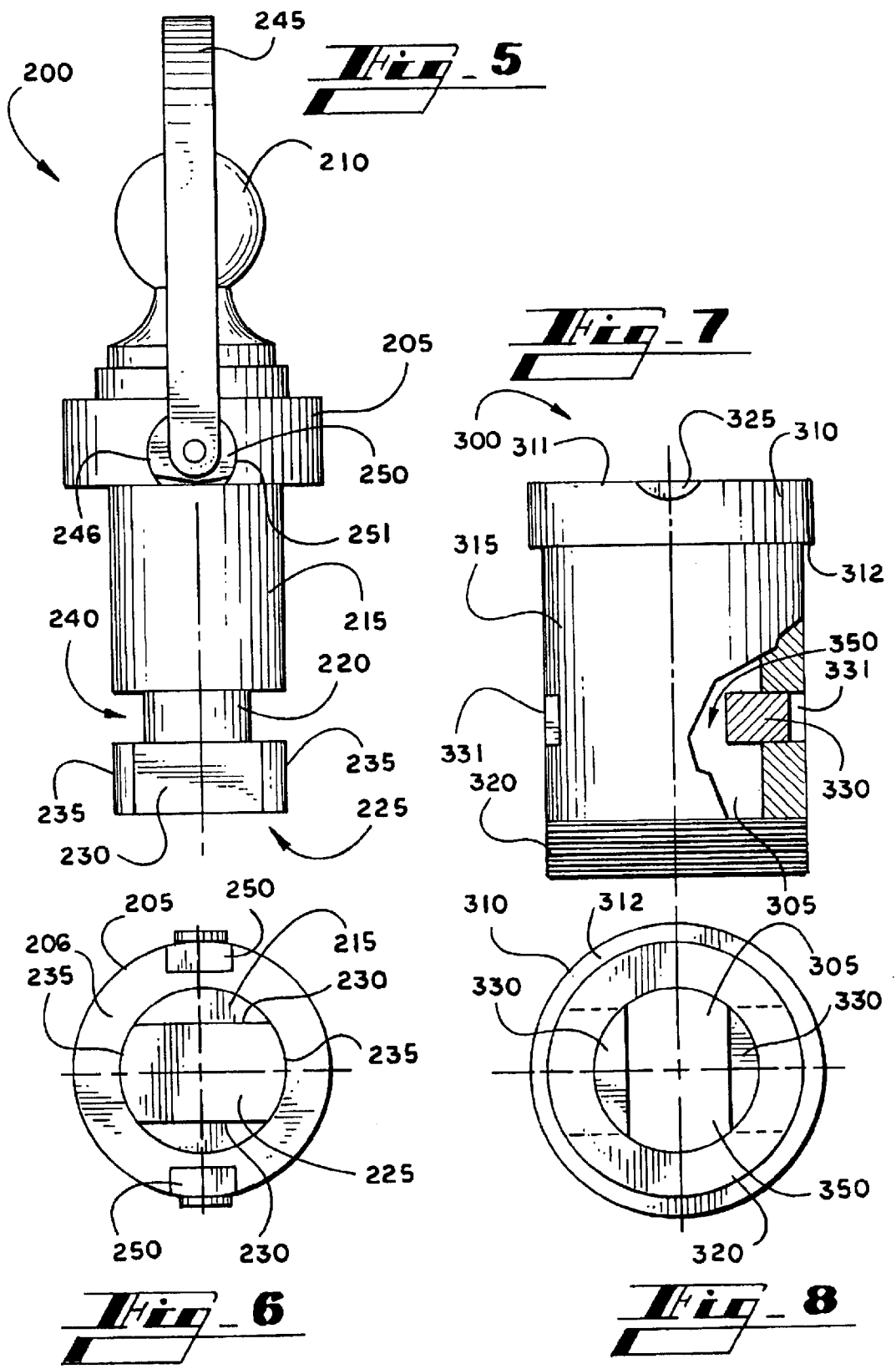

CAM LOCKING REMOVABLE HITCH ASSEMBLY APPARATUS AND SYSTEM

BACKGROUND

I. Field of the Invention

The present invention relates generally to the field of vehicle hitches and more particularly to a cam locking removable hitch assembly apparatus and system.

II. Description of the Related Art

"Goose neck" trailers have a bent neck that is connected to a pick-up truck (and other vehicles) in the bed of the pick-up truck. As such, the bed of the pick up must include a hitch-ball to receive the neck of the trailer. When not in use, the hitch-ball typically is removed so that the bed of the trailer can be used for payload purposes. If the hitch-ball is present, it can interfere or damage the items in the bed. Often times, hitch-balls must be screwed into and out of a receptor. In these types of apparatuses, the hitch-ball can be become rusted or other wise frozen in the receptor, thereby making the hitch-ball difficult to remove.

SUMMARY

In general, the invention features a cam locking removable hitch assembly apparatus and system for use with "goose neck" type trailers. The apparatus and system allow quick placement and removal of a hitch-ball in a truck bed. The system is generally adapted to be fit, retrofit and be an integral part of a bed of a pick-up truck or other suitable vehicle. The cam locking removable hitch assembly apparatus generally includes a hitch-ball shank in engagement with a shank sleeve that is in engagement with an outer sleeve. A nut is in threaded engagement with a lower portion of the hitch-ball shank keeping the outer sleeve secured around the shank sleeve. Shank lugs, located on a lower portion of the hitch-ball shank engage with shear lugs located on an inner wall of the shank sleeve. A cam on the upper portion of the hitch-ball shank engage with cam grooves on an upper portion of the shank sleeve, thereby locking the hitch-ball shank within the shank sleeve. The hitch assembly apparatus can be connected to a frame that is secured in a bed of a truck forming a cam locking removable hitch assembly system.

In general, in one aspect, the invention features a hitch assembly apparatus, including a hitch-ball shank, a shank sleeve connected to the hitch-ball shank, an outer sleeve connected to the shank sleeve and a sleeve nut connected to the shank sleeve and in contact with a portion of the outer sleeve.

In one implementation, the apparatus further includes a hitch-ball connected to the hitch-ball shank.

In another implementation, the hitch-ball shank includes an upper head, a first cylindrical shaft connected to the upper head, a second cylindrical shaft connected to the first cylindrical shaft and a lower base connected to the second cylindrical shaft.

In another implementation, the lower base comprises shank lugs arranged orthogonally with flats.

In another implementation, the apparatus includes cams connected to the upper head.

In another implementation, the cams are generally circular with a flattened edge.

In another implementation, the apparatus includes a handle connected to the cams.

In still another implementation, the shank sleeve includes a main body having an elongated hollow interior, an upper head having cam pockets and shear lugs connected to an interior wall of the main body, the shank lugs being positioned in opposition, forming an aperture.

In yet another implementation, the apparatus includes a threaded end on the main body of the shank sleeve.

In another implementation., the outer sleeve comprises a main body having a hollow interior, a first flat edge and a second tapered edge.

In another implementation, the sleeve nut comprises a main body having a hollow interior and a inner tapered edge in contact with the second tapered edge on the outer sleeve.

In another implementation, the sleeve nut is in threaded engagement with a threaded portion on an end of the shank sleeve.

In another implementation, the shank sleeve surrounds a portion of the hitch-ball shank and the outer sleeve surrounds a portion of the shank sleeve.

In another implementation, the apparatus further includes a frame portion connected to the shank sleeve and the outer sleeve.

In another aspect, the invention features a hitch assembly kit, including a hitch-ball shank having and upper head and a lower base, cams positioned in the upper head, a handle connected to the cams and shank lugs positioned on the lower base, a shank sleeve having a main body with a hollow interior, an upper head having cam pockets, a first shear lug positioned in opposition to a second shear lug in the hollow interior, wherein the lower base of the hitch-ball shank is adapted to be positioned within the hollow interior of the shank sleeve, an outer sleeve adapted to be positioned around the shank sleeve and an internally threaded sleeve nut adapted to be in threaded engagement with a threaded end of the shank sleeve, wherein the shank lugs and the shear lugs are adapted to be engaged when the hitch-ball shank is rotated with respect to the shank sleeve, and wherein the cams are adapted to engage the cam pockets when the handle is rotated.

In one implementation, the kit further includes a frame adapted to be connected to a truck and adapted to be connected to the outer sleeve.

In another aspect, the invention features a hitch assembly system, including a truck, a frame connected to the truck, a cam locking removable hitch assembly apparatus, having a hitch-ball shank, a shank sleeve connected to the hitch-ball shank, an outer sleeve connected to the shank sleeve and a sleeve nut connected to the shank sleeve and in contact with a portion of the outer sleeve.

In still another aspect, the invention features a hitch apparatus, including a hitch-ball shank having an upper head, a first cylindrical shaft connected to the upper head, a second cylindrical shaft connected to the first cylindrical shaft and a lower base connected to the second cylindrical shaft and a shank sleeve having a main body having an elongated hollow interior, an upper head having cam pockets and shear lugs connected to an interior wall of the main body, the shear lugs being positioned in opposition, forming an aperture, wherein the main body of the shank sleeve surrounds the first cylindrical shaft, the second cylindrical shaft and the lower base, the second cylindrical shaft being positioned between the shear lugs.

In one implementation, the apparatus further includes cam pockets positioned within the upper head of the shank sleeve and cams positioned in the upper head of the hitch-ball shank and in opposition to the cam pockets when in a first position and engaged with the cam pockets when in a second position.

In still another aspect, the invention features a method, including providing a cam locking removable hitch assembly apparatus, having a hitch-ball shank having an upper head having cams positioned in the upper head, a handle connected to the cams, a first cylindrical shaft connected to the upper head, a second cylindrical shaft connected to the first cylindrical shaft and a lower base having flats orthogonally arranged with shank lugs and being connected to the second cylindrical shaft, wherein a groove is formed between the first cylindrical shaft and the lower base and a shank sleeve having a main body having an elongated hollow interior, an upper head having cam pockets, and shear lugs connected to an interior wall of the main body, the shear lugs being positioned in opposition, forming an aperture, inserting the hitch-ball shank into the shank sleeve by positioning the first and second cylindrical shafts and the lower base in the hollow interior of the shank sleeve, positioning the cams orthogonal to the cam pockets, and inserting the lower base through the aperture, rotating the hitch-ball shank with respect to the shank sleeve, thereby moving the shear lugs through the groove and positioning the shank lugs underneath the shear lugs, wherein the lower base is orthogonally arranged with respect to the aperture and rotating the handle, so that the cams engage with the cam pockets.

One advantage of the invention is that hitch-ball shank containing the hitch-ball can be quickly placed and removed as needed.

Another advantage of the invention is that the shank sleeve remains in a non-interfering position in a truck bed when the system is not in use.

Another advantage is that the system can be placed and securely locked being ready for use with a trailer with a simple rotation.

Another advantage of the invention is that the handle prevents a trailer from being positioned on the hitch-ball if the hitch-ball shank has not been properly rotated and locked into a secure position.

Another advantage of the invention is that the handle allows removal of the hitch-ball without touching the hitch-ball that is typically lubricated and messy.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 illustrates a side view of an embodiment of a cam locking removable hitch assembly system;

FIG. 3 illustrates a side internal view of an embodiment of a cam locking removable hitch assembly apparatus in a first position;

FIG. 4 illustrates a side internal view of an embodiment of a cam locking removable hitch assembly apparatus in a second position;

FIG. 5 illustrates a side view of an embodiment of a hitch-ball shank;

FIG. 6 illustrates a bottom view of the embodiment of the hitch-ball shank of FIG. 5;

FIG. 7 illustrates a partial cut-away side view of an embodiment of a shank sleeve; and FIG. 8 illustrates a bottom view of the embodiment of the shank sleeve of FIG. 7.

DETAILED DESCRIPTION

Figure 1:
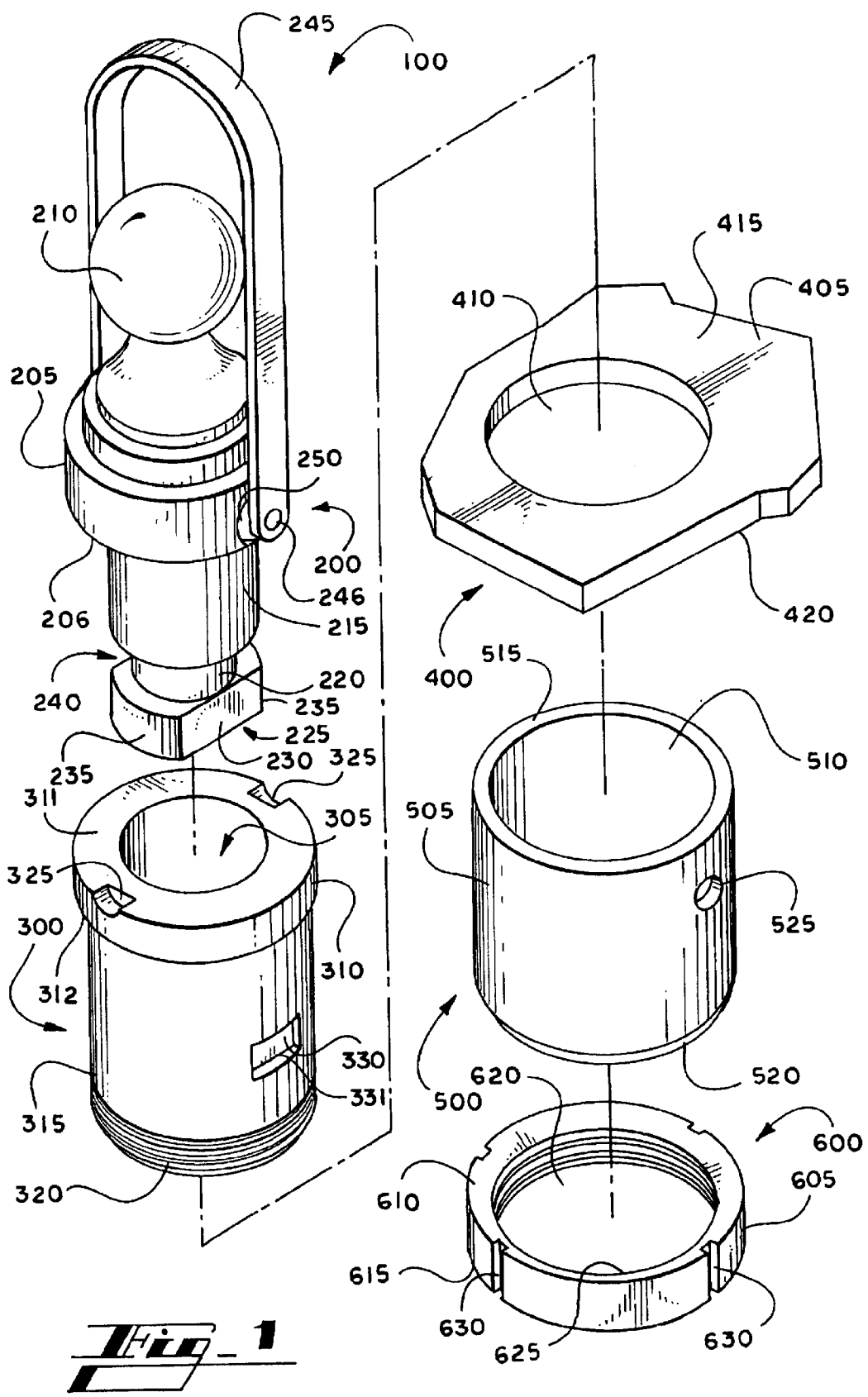
FIG. 1 illustrates a perspective view of constituent components of an embodiment of a cam locking removable hitch assembly system.

Referring to the drawings wherein like reference numerals designate corresponding parts throughout the several figures, reference is made first to FIG. 1 that illustrates a perspective view of constituent components of an embodiment of a cam locking removable hitch assembly system 100. The system 100 generally includes a hitch-ball shank 200, a shank sleeve 300, a frame portion 400, an outer sleeve 500 and a sleeve nut 600. Generally, the hitch-ball shank 200 and the shank sleeve 300 are used in conjunction as a basic cam locking removable hitch assembly apparatus. The additional frame portion 400, outer sleeve 500 and sleeve nut 600 used in conjunction with a truck or other suitable vehicle operate as a cam locking removable hitch assembly system 100. The hitch-ball shank 200, the shank sleeve 300, the frame portion 400, the outer sleeve 500 and the sleeve nut 600 are generally adapted to fit together forming the system 100 as is discussed in further detail in the description below.

The hitch-ball shank 200 includes an upper head 205 that can have a generally cylindrical shape. The upper head 205 includes a hitch-ball 210. A first cylindrical shaft 215 is connected to a lower flat surface 206 of the upper head 205. A second cylindrical shaft 220 having a generally smaller diameter than the first cylindrical shaft, is connected to a lower portion of the first cylindrical shaft 215. The hitch-ball shank 200 further includes a lower base 225 connected to a lower portion of the second cylindrical shaft 220. The lower base 225 has a generally cylindrical shape for the exception of having flat side's ("flats") 230. The generally cylindrical shape of the lower base 225 is retained with outer curved shank lugs 235. A perimeter groove 240 is generally formed between the lower base 225 and the first cylindrical shaft 215. In a typical implementation, the upper head 205, the first and second shafts 215, 220 and the lower base 225 are an integral unit, forming the hitch-ball shaft 200.

The hitch-ball shank 200 further includes a handle 245 connected to the upper head 205. The handle 245 has a general horseshoe shape, although it is understood that the handle 245 can have other shapes. The handle 245 is connected to the upper head 205 through a cam 250 that is pivotally connected to the upper head 205. Generally, the handle 245 pivots with respect to the upper head 205 about a pivot point 246. Further details of the cam 250 are discussed in the description below with respect to FIG. 2.

The shank sleeve 300 is generally cylindrical having a hollow interior 305 through the length of the shank sleeve 300. The shank sleeve 300 generally includes an upper head 310 having an upper flat edge 311 and a lower flat edge 312, a main body 315 and a lower threaded end 320. The upper head 310 typically includes cam pockets 325. The shank sleeve 300 can further include shear lugs 330 that are connected to the main body 315 between the upper head 310 and the threaded end 320. The shear lugs 330 typically protrude into the hollow interior 305 as discussed in further detail in the description below. However, in an implementation, the shear lugs 330 can be connected to the main body 315 by first including lug holes 331 in the main body 315, through which the shear lugs 330 are connected. As such, the shear lugs 330 may be visible from an external view of the shank sleeve 300.

The frame portion 400 is typically part of a larger frame apparatus that is adapted to be fit, retrofit or be an integral part of a suitable vehicle containing the cam locking removable hitch assembly apparatus. Typically, the frame portion 400 includes a generally planar body 405 having a hole 410 through the body 405. The body 405 further includes an upper surface 415 and a lower surface 420.

The outer sleeve 500 generally includes a main body 505 having a hollow interior 510 through the length of the body 505. The body 505 generally includes an upper flat edge 515 and a lower tapered edge 520. The body 505 can include one or more threaded attachment holes 525.

The sleeve nut 600 generally includes a main body 605 having an inner tapered upper edge 610 and a flat lower edge 615. The body 605 has a hollow interior 620 and inner threads 625. The body 605 can further include a plurality of attachment grooved 630.

Still referring to FIG. 1, the hitch-ball shank 200, the shank sleeve 300, the frame portion 400, the outer sleeve 500 and the sleeve nut 600 as constituent components are adapted to interconnect together as the hitch assembly system 100. The hollow interior 305 of the shank sleeve 300 is a female connector for the first and second shafts 215, 220 and the lower base 225 of the hitch-ball shank 200. As such, the first and second shafts 215, 220 and the lower base 225 fit through the hollow interior 305 of the shank sleeve 300. The outer curved edges of the shank lugs 235 are described above as having a generally cylindrical shape. This shape, including the general curvature of the shank lugs 235 have the general same shape and curvature of the first shaft 215 so that the first and second shafts 215, 220 and the lower base 225 of the hitch-ball shank 200 have a snug fit with the hollow interior 305 of the shank sleeve 300. As discussed further in the description below, the shank lugs 235 and the flats 230 have to be oriented in a particular manner in order to pass through an aperture formed between the shear lugs 330 in the hollow interior 305. Once the hitch-ball shank 200 and the shank sleeve 300 are interconnected the lower flat surface 206 of the upper head 205 rests against the upper flat edge 311 of the upper head 310.

The main body 315 of the shank sleeve 315 is a male connector to the hole 410, which acts as a female connector, on the main body 405 of the frame portion 400. As such, the outer diameter of the main body 315 and the diameter of the hole 410 are substantially equal, thereby providing a snug fit. Once the main body 315 of shank sleeve 300 is mated with the hole 410 on the frame portion 400, the lower flat edge 312 of the upper head 310 rests against a portion of the upper surface 415. The diameter of the upper head 310 is larger than the hole 410 such that the upper head 310 cannot pass through the hole 410.

The main body 315 typically protrudes from the lower surface 420 of the main body 405 of the frame portion 400. The outer sleeve 500, as a female connector, is adapted to mate with the main body 315 of the shank sleeve 300, as a male connector. As such, the hollow interior 510 has substantially the same diameter of the hole 410 as well as the outer diameter of the main body 315. Once the outer sleeve 500 is interconnected with the shank sleeve 300, the upper flat edge 515 rests against a portion of the lower surface 420 of the frame portion 400. In an implementation, the outer sleeve is permanently connected to the frame portion, such as by welding. Furthermore, the threaded end 320 of the main body 315 of the shank sleeve 300 generally protrudes from the tapered edge 520 of the outer sleeve 500.

In this orientation, the sleeve nut 600 is adapted to be screwed onto the protruding threaded end 320. The inner threads 625 are adapted to be put into threaded engagement with the threaded end 310. As such, the hollow interior 620 of the sleeve nut 600 has substantially the same diameter as the outer diameter of the main body 315. When the sleeve nut 600 is screwed onto the shank sleeve 300, the inner tapered edge 610 of the sleeve nut 600 meets with the lower tapered edge 520 of the outer sleeve 500. As the sleeve nut 600 is tightened, the tapered edges 520, 610 become further engaged. The engagement of the tapered edges 520, 610 prevents unwanted movement of the shank sleeve 300 relative to the outer sleeve 500 as well as relative to the frame portion 400. As such, general unwanted movement is prevented in the cam locking removable hitch assembly system when it is connected to a suitable vehicle as being used to attach to a trailer, such as a "goose-neck" type trailer.

FIG. 2 illustrates a side view of an embodiment of a cam locking removable hitch assembly system 100. The constituent components, that is, the hitch-ball shank 200, the shank sleeve 300, the frame portion 400, the outer sleeve 500 and the sleeve nut 600 are interconnected as a system 100 as described above with respect to FIG. 1 and are incorporated into a bed 700 of a truck (not shown in full). In the assembled, state the upper heads 205, 310 of the hitch-ball shank 200 and the shank sleeve 300, respectively, are generally flush with one another, the lower flat surface 206 being in contact with the upper flat edge 311. The lower flat edge 312 is in contact with a portion of the upper surface 415 of the frame portion 400. The frame portion 400, which can be an integral part of a larger frame, is connected to a lower surface 710 of the bed 700. It is generally understood that a variety of frame types can be used to connect the system 100 to or adjacent the truck bed 700. In general, the upper flat edge 311 of the upper head 310 of the hitch-ball shank 300 is typically flush with an upper surface 705 of the truck bed. In this way, the upper head 310 is kept below the surface 705 of the truck bed 700. The frame portion 400 is sandwiched between the lower flat edge 312 of the upper head 310 and the upper flat edge 515 of the outer sleeve 500. As described above, the outer sleeve 500 can be permanently attached as an integral part of the frame portion 400. The sleeve nut 600 is in threaded engagement with the threaded edge 320 of the shank sleeve 300, thereby securing the shank sleeve 300 and therefore the hitch-ball shank 200, within the interior 510 of outer sleeve 500.

In general, the frame portion 400, and possible the outer sleeve 500 can be permanently affixed to the truck to or adjacent the truck bed 700. Furthermore, so long as the sleeve nut 600 is attached, the shank sleeve 300 can also remain permanently affixed. The sleeve nut can typically only be accessed from underneath the truck bed 700. As such, the user of the system 100 typically desires to leave the sleeve nut 600 in place. The attachment grooves 630 are present in order to easily attach a tightening tool so that the sleeve nut 600 can be securely affixed to the shank sleeve 300. In general, the hitch-ball shank 200 can be easily placed and removed as needed, and be stored out of the way. With the hitch-ball shank 200 removed from the rest of the system 100, the upper flat edge 311 of the upper head 310 remains generally flush with the upper surface 705 of the truck bed 700, and therefore does not provide an edge to which items in the truck bed 700 can catch when the system 100 is not in use. Furthermore, the hollow interiors 305, 510, 620 of the system allow any water in the truck bed 700 to simply flow out of the bed 700 and the system 100, thereby not gathering in the hollow interiors 305, 510, 620 of the system 100. In another implementation, the system 100 can further include a cap (not shown) that can affix to the upper head 310 in order to prevent water and debris from entering the system 100 from the truck bed 700.

Still referring to FIG. 2, further details of the cam 250 and cam pocket 325 are illustrated. The cam 250 is oriented within a cam depression 251 located within the upper head 205. When the hitch-ball shank 200 is removed from the shank sleeve 300, the cam 325 moves freely within the cam depression 251 as the handle 245 is pivoted about its pivot point 246. However, when the hitch-ball shank 200 is placed within the shank sleeve 300, the movement of the cam 250 and this the handle 245 is limited. As mentioned shortly above and described in further detail below, the shank lugs 235 and the flats 230 of the lower base 225 have to be oriented in a particular manner in order to pass through an aperture formed between the shear lugs 330 in the hollow interior 305. In this particular orientation, when the hitch-ball shank 200 is first placed into the shank sleeve 300, the cam 250 is positioned generally orthogonal, or approximately ninety degrees from the cam pockets 325. Furthermore, in this orthogonal orientation, the hitch-ball shank 200 can be rotated freely within the shank sleeve 300, so long as the handle remains positioned upward. The cam 325 has a generally circular shape but includes a flattened or roughly curved edge 252. When the handle 245 is positioned upward, the edge 252 is positioned in opposition to the upper flat edge 311 of the upper head 310 of the shank sleeve 300. In this opposing position, the hitch-ball shank 200 can rotate freely within the shank sleeve 300. Furthermore, unless the cam 250 is positioned over the cam pocket 325, the handle 245 cannot fully be rotated about the pivot point 246 because the cam's 250 movement is limited by coming into contact with the upper flat edge 311. However, once the cam depression 251 and the cam pocket 325 are aligned, the edge 252 is opposed to the cam pocket 325. When the cam depression 251 and the cam pocket are aligned, a circular depression is formed that can allow the cam 250 to rotate into and engage the cam pocket 325, instead of contacting the upper flat edge 311 as described above. Furthermore, the handle 245 can now more fully rotate about the pivot point 246 that allows the handle 245 to rest against the bed 700. With the cam 250 positioned in the cam pocket 325, the hitch-ball shank 200 cannot rotate with respect to shank sleeve 300. Therefore, the hitch-ball shank 200 is locked into place.

In the above description, reference is made to an aperture into which the shank lugs 235 and the flats 230 on the lower base 225 have to be oriented in a particular manner in order to pass through an aperture. The movement of the shank lugs 235 and the flats 230 on the lower base 225 with respect to this aperture and the shear lugs 330, and the relationship with the cam 250 are now discussed with respect to FIGS. 3–8.

FIG. 3 illustrates a side internal view of an embodiment of a cam locking removable hitch assembly apparatus in a first position. The apparatus generally includes the hitch-ball shank 200 and the shank sleeve 300. In this internal view, the shear lugs 330 are shown in opposition, creating a narrow aperture 350 between the shear lugs 330. When the hitch-ball shank 200 is placed into the shank sleeve 300 with the cams 250 and the cam pockets 325 positioned orthogonally as described above, the lower base 225 can pass through the aperture 350, where the flats 230 generally contact the shear lugs 330 as the flats 230 pass by the shear lugs 330. In this position, a snug fit is attained between the first cylindrical shaft 215 of the hitch-ball shank 200 and the hollow interior 305 of the shank sleeve 300. The second cylindrical shaft 220 is positioned between the shear lugs 330. Furthermore, the lower base 225 along with the flats 230 and the shank lugs 235 protrude into the remaining hollow interior 305 of the shank sleeve 300.

FIG. 4 illustrates a side internal view of an embodiment of a cam locking removable hitch assembly apparatus in a second position. As described above with respect to FIG. 3, the apparatus generally includes the hitch-ball shank 200 and the shank sleeve 300. In this second position, the hitch-ball shank 200 has been rotated ninety degrees with respect to the shank sleeve 300. The shank lugs 235 have also been rotated ninety degrees. The second cylindrical shaft 220 is still positioned between the shear lugs 330 that have moved through the groove 240 during the rotation. In this position, the hitch-ball shank 200 cannot be pulled from the shank sleeve 300 because the lower base 225 is now orthogonally positioned with respect to the aperture 350. In this orthogonal position, the shear lugs 330 now block the shank lugs 235 from any upward movement, the shank lugs 235 being positioned underneath the shear lugs 330. In addition, after this ninety degree rotation, the cam depression 251 is aligned with the cam pocket 325 and the cam 250 can now be rotated as described with respect to FIG. 2, thereby locking the hitch-ball shank 200 with respect to the shank sleeve 300, preventing the shank lugs 235 from rotating with respect to the shear lugs 330. As such, when the handle is rotated creating the cam lock, the hitch-ball shank 200 cannot rotate or be pulled up from the shank sleeve 300. Therefore, the system 100 is ready to be connected to a trailer for use. It is also appreciated that when the hitch-ball shank 200 is being inserted into the shank sleeve 300, if the cams 240 are not positioned orthogonally with the cam pockets 325 as described above, the lower portion 225 is not properly aligned with the aperture 350 and therefore the shank lugs 220 and the shear lugs 330 bump into each other. Therefore, the user may have to rotate the hitch-ball shank 200 slightly in both directions in order to attain proper alignment between the lower portion 225 and the aperture 350.

FIG. 5 illustrates a side view of an embodiment of a hitch-ball shank 200. The hitch-ball shank includes the upper head 205 that can have a generally cylindrical shape, the hitch-ball 210, the first cylindrical shaft 215, the second cylindrical shaft 220, the lower base 225 having a generally cylindrical shape in the curved shank lugs 235, but for the exception of the flats 230, and the perimeter groove 240. The hitch-ball shank 200 further includes the handle 245, the cam 250 that is pivotally connected to the upper head 205 at pivot point 246, the cam being in cam depression 251.

FIG. 6 illustrates a bottom view of the embodiment of the hitch-ball shank 200 of FIG. 5. This view illustrates the lower flat edge 206 of the upper head 205, including the bottom view of the cams 250, as well as a bottom view of the first cylindrical shaft 215. This bottom view further illustrates how the curvature of the shank lugs shank lugs 235 generally mimics the curvature of the first cylindrical shaft 215, thereby allowing the first cylindrical shaft and the lower base 225 to fit into and move through the hollow interior 305 of the shank sleeve 300 as described with respect to FIG. 1.

FIG. 7 illustrates a partial cut-away side view of an embodiment of a shank sleeve 300. The shank sleeve 300 generally includes the hollow interior 305, the upper head 310 having the upper flat edge 311, the lower flat edge 312 and the cam pockets 325, the main body 315, the lower threaded end 320, the shear lugs 330 protruding into the hollow interior 305 and forming the aperture 350, the shear lugs being optionally inserted into the main body 315 through lug holes 331.

FIG. 8 illustrates a bottom view of the embodiment of the shank sleeve 300 of FIG. 7. In this bottom view, the lower flat edge 312, as well as the hollow interior 305 and the lower portion of threaded end 320 are shown. The shear lugs 330 are shown protruding into the hollow interior 305 thereby forming aperture 350. It is appreciated that the aperture 350 has substantially the same shape of the lower base 225 of the hitch-ball shank 200, thereby allowing the lower base 225 to pass through the aperture 350 when properly aligned as described above.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A hitch assembly apparatus, comprising:
   a hitch-ball shank;
   a shank sleeve connected to the hitch-ball shank;
   an outer sleeve connected to the shank sleeve; and
   a sleeve nut connected to the shank sleeve and in contact with a portion of the outer sleeve.

2. The apparatus as claimed in claim 1 further comprising a hitch-ball connected to the hitch-ball shank.

3. The apparatus as claimed in claim 1 wherein the hitch-ball shank comprises:
   an upper head;
   a first cylindrical shaft connected to the upper head;
   a second cylindrical shaft connected to the first cylindrical shaft; and
   a lower base connected to the second cylindrical shaft.

4. The apparatus as claimed in claim 3 wherein the lower base comprises shank lugs arranged orthogonally with flats.

5. The apparatus as claimed in claim 3 further comprising cams connected to the upper head.

6. The apparatus as claimed in claim 5 wherein the cams are generally circular with a flattened edge.

7. The apparatus as claimed in claim 5 further comprising a handle connected to the cams.

8. The apparatus as claimed in claim 1 wherein the shank sleeve comprises:
   a main body having an elongated hollow interior;
   an upper head having cam pockets; and
   shear lugs connected to an interior wall of the main body, the shank lugs being positioned in opposition, forming an aperture.

9. The apparatus as claimed in claim 8 further comprising a threaded end on the main body of the shank sleeve.

10. The apparatus as claimed in claim 1 wherein the outer sleeve comprises a main body having a hollow interior, a first flat edge and a second tapered edge.

11. The apparatus as claimed in claim 10 wherein the sleeve nut comprises a main body having a hollow interior and a inner tapered edge in contact with the second tapered edge on the outer sleeve.

12. The apparatus as claimed in claim 11 wherein the sleeve nut is in threaded engagement with a threaded portion on an end of the shank sleeve.

13. The apparatus as claimed in claim 1 wherein the shank sleeve surrounds a portion of the hitch-ball shank and the outer sleeve surrounds a portion of the shank sleeve.

14. The apparatus as claimed in claim 1 further comprising a frame portion connected to the shank sleeve and the outer sleeve.

15. A hitch assembly kit, comprising:
   a hitch-ball shank having and upper head and a lower base, cams positioned in the upper head, a handle connected to the cams and shank lugs positioned on the lower base;
   a shank sleeve having a main body with a hollow interior, an upper head having cam pockets, a first shear lug positioned in opposition to a second shear lug in the hollow interior, wherein the lower base of the hitch-ball shank is adapted to be positioned within the hollow interior of the shank sleeve;
   an outer sleeve adapted to be positioned around the shank sleeve; and
   an internally threaded sleeve nut adapted to be in threaded engagement with a threaded end of the shank sleeve, wherein the shank lugs and the shear lugs are adapted to be engaged when the hitch-ball shank is rotated with respect to the shank sleeve, and wherein the cams are adapted to engage the cam pockets when the handle is rotated.

16. The kit as claimed in claim 15 further comprising a frame adapted to be connected to a truck and adapted to be connected to the outer sleeve.

17. A hitch assembly system, comprising:
   a truck;
   a frame connected to the truck;
   cam locking removable hitch assembly apparatus, comprising:
      a hitch-ball shank;
      a shank sleeve connected to the hitch-ball shank;
      an outer sleeve connected to the shank sleeve; and
      a sleeve nut connected to the shank sleeve and in contact with a portion of the outer sleeve.

18. A hitch apparatus, comprising:
   a hitch-ball shank having an upper head, a first cylindrical shaft connected to the upper head, a second cylindrical shaft connected to the first cylindrical shaft and a lower base connected to the second cylindrical shaft; and
   a shank sleeve having a main body having an elongated hollow interior, an upper head having cam pockets and shear lugs connected to an interior wall of the main body, the shear lugs being positioned in opposition, forming an aperture,
   wherein the main body of the shank sleeve surrounds the first cylindrical shaft, the second cylindrical shaft and the lower base, the second cylindrical shaft being positioned between the shear lugs.

19. The apparatus as claimed in claim 18 further comprising:
   cam pockets positioned within the upper head of the shank sleeve; and
   cams positioned in the upper head of the hitch-ball shank and in opposition to the cam pockets when in a first position and engaged with the cam pockets when in a second position.

20. A method, comprising:

providing a cam locking removable hitch assembly apparatus, having:
- a hitch-ball shank having an upper head having cams positioned in the upper head, a handle connected to the cams, a first cylindrical shaft connected to the upper head, a second cylindrical shaft connected to the first cylindrical shaft and a lower base having flats orthogonally arranged with shank lugs and being connected to the second cylindrical shaft, wherein a groove is formed between the first cylindrical shaft and the lower base; and
- a shank sleeve having a main body having an elongated hollow interior, an upper head having cam pockets, and shear lugs connected to an interior wall of the main body, the shear lugs being positioned in opposition, forming an aperture;

inserting the hitch-ball shank into the shank sleeve by positioning the first and second cylindrical shafts and the lower base in the hollow interior of the shank sleeve, positioning the cams orthogonal to the cam pockets, and inserting the lower base through the aperture;

rotating the hitch-ball shank with respect to the shank sleeve, thereby moving the shear lugs through the groove and positioning the shank lugs underneath the shear lugs, wherein the lower base is orthogonally arranged with respect to the aperture; and rotating the handle, so that the cams engage with the cam pockets.

* * * * *